Figure 1:
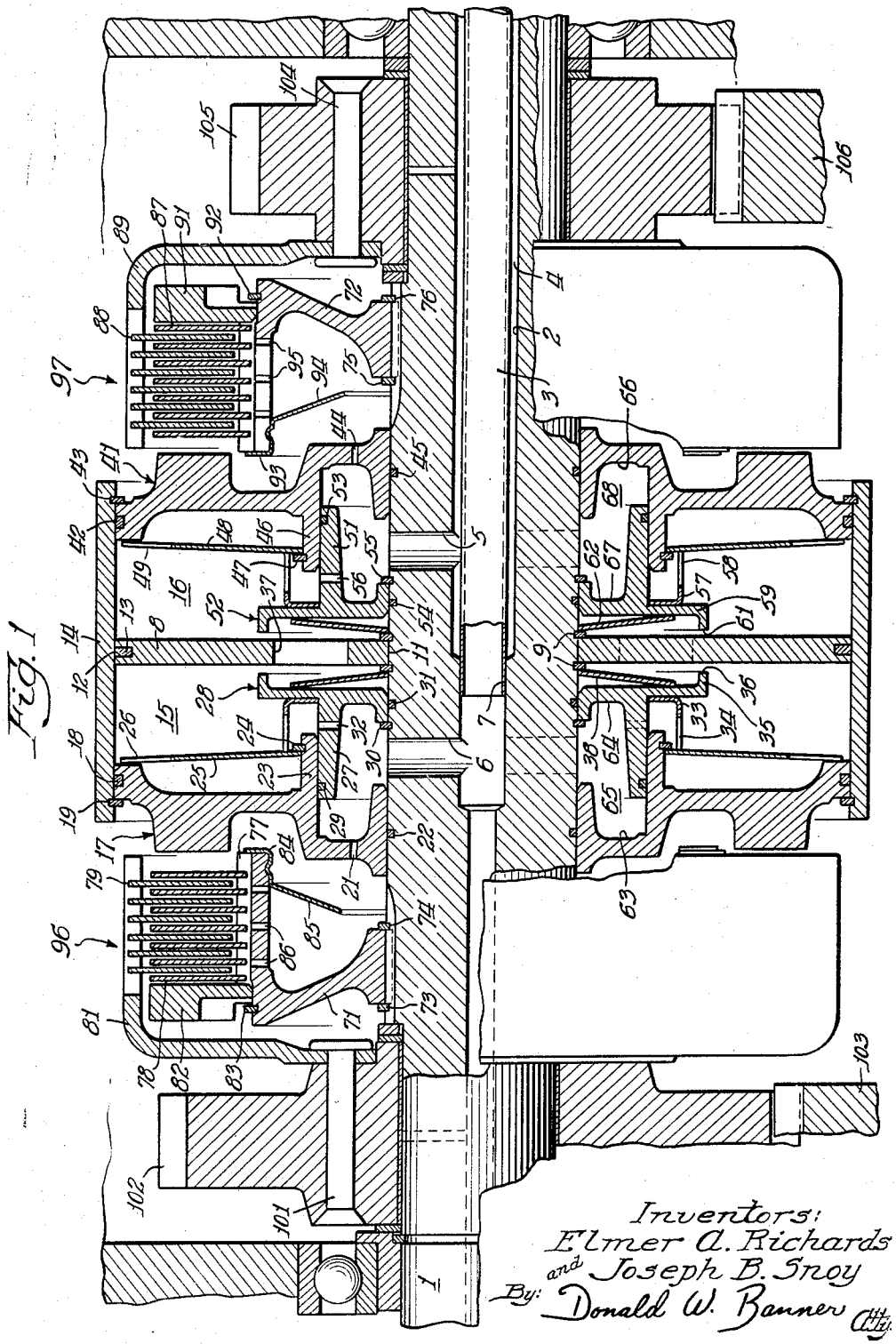

Jan. 12, 1960

E. A. RICHARDS ET AL 2,920,732

DOUBLE HYDRAULIC OPERATED CLUTCH DEVICE

Filed June 25, 1956

2 Sheets-Sheet 1

Inventors:
Elmer A. Richards
and Joseph B. Snoy
By: Donald W. Banner Atty.

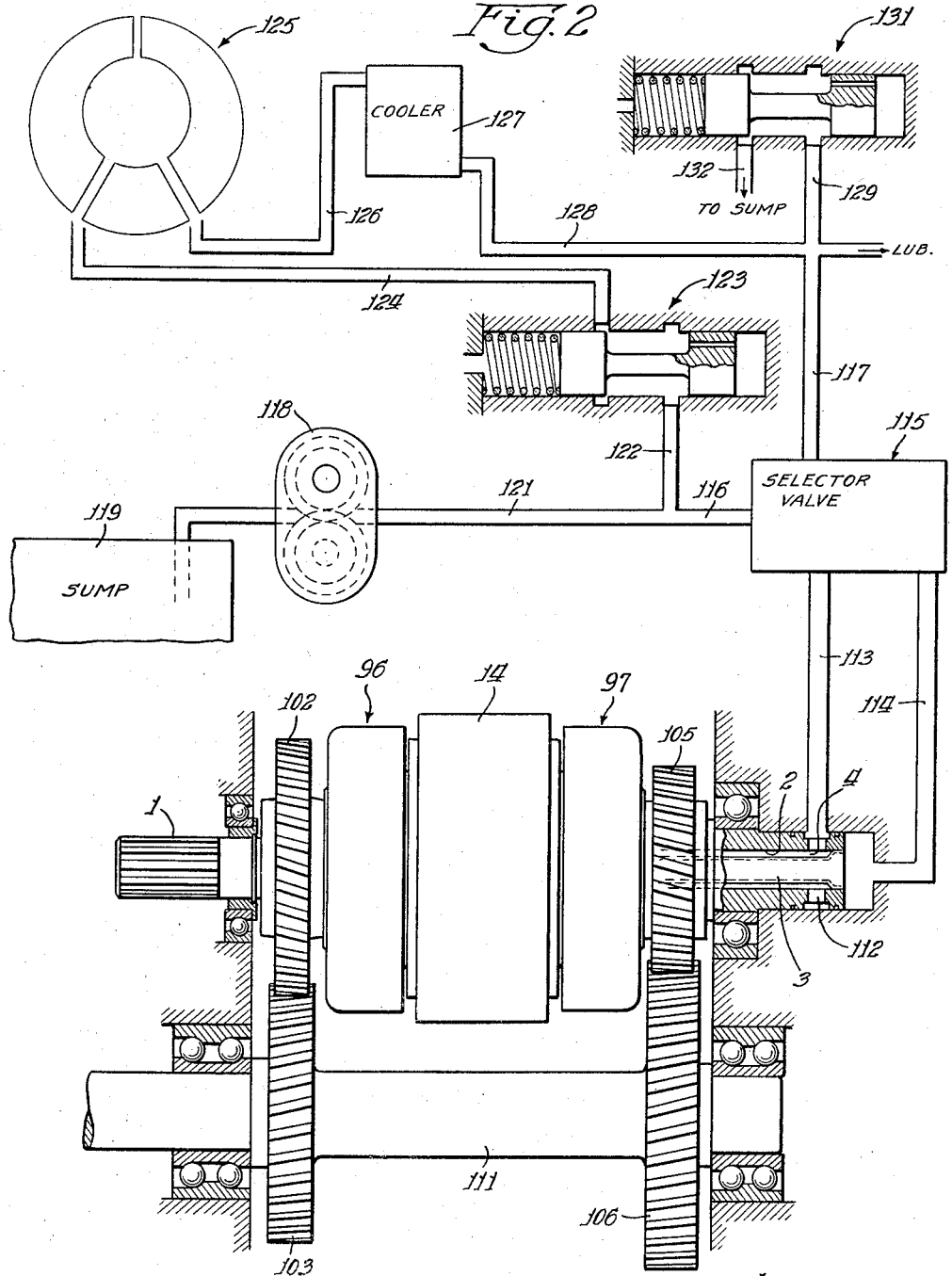

United States Patent Office 2,920,732
Patented Jan. 12, 1960

2,920,732

DOUBLE HYDRAULIC OPERATED CLUTCH DEVICE

Elmer A. Richards and Joseph B. Snoy, Rockford, Ill., assignors to Borg-Warner Corporation, Chicago, Ill., a corporation of Illinois Application June 25, 1956, Serial No. 593,479

18 Claims. (Cl. 192—87)

This invention relates to hydraulically operated clutch mechanisms, and more particularly to hydraulically operated clutch mechanisms of the type designed to operate either of a pair of opposed clutch packs mounted upon a rotating shaft.

Opposed clutch packs having interleaved clutch plates which are mounted upon rotating shafts and operable by a piston disposed between the clutch packs are known to the prior art. When such a piston was hydraulically operated in the past it required, frequently, expensive and complicated mechanisms to effectuate the clutch operation, and furthermore required a considerable period of time to effect the clutch actuation.

It is therefore one object of the present invention to provide a new and improved hydraulic clutch actuation mechanism which is simple, reliable and relatively inexpensive, and which furthermore operates to effect clutch actuation much more rapidly than was heretofore possible with comparable devices.

Another object of the present invention is to provide a hydraulically operated clutch mechanism in accordance with the preceding object in which the effects of centrifugal force on the hydraulic fluid in the rotating clutch are nullified.

Another object is to provide a device in accordance with the preceding objects in which a piston housing is provided which is maintained filled with hydraulic fluid at all times, clutch actuation being effected by increasing the fluid pressure in one portion of the housing.

Another object is the provision of a device in accordance with the preceding objects in which the piston housing is axially movable with either of the two pistons disposed therein.

Another object is the provision of a device in accordance with the preceding objects in which the piston housing is divided into two portions by a reaction plate which normally permits communication between the two sides of the housing, and in which pistons are provided for stopping such intercommunication upon predetermined pressure conditions in the housing.

Another object is the provision of a device in accordance with the preceding objects in which simple return mechanisms are provided to effect neutralization of the clutch mechanism as desired.

Another object is the provision of a device in accordance with the preceding objects in which the movable piston housing prevents simultaneous actuation of both of the clutch packs.

Other objects and features of the invention will be readily apparent to those skilled in the art from the specification and appended drawings illustrating certain preferred embodiments in which:

Figure 1 discloses a central, longitudinal sectional view through a device incorporating the principles of the present invention;

Figure 2 is a schematic diagram illustrating a circuit containing the device shown in Figure 1.

In Figure 1 there is disclosed a longitudinally extending, rotatable shaft 1 adapted for connection to a prime mover, such as an internal combustion engine (not shown) having an elongated bore 2 extending therethrough. Disposed within the bore 2 is an imperforate tube 3 extending partway through the bore 2, as illustrated in the figure, and having an outer diameter such as to be spaced from the sides of an enlarged portion of the bore 2 to define an annular fluid channel 4 therebetween. In fluid communication with the channel 4 are a plurality of circumferentially spaced, radially extending ports 5 extending to the exterior of the shaft 1; also extending from the bore 2 to the exterior of the shaft 1 are a plurality of circumferentially spaced, radially extending ports 6 which, as disclosed in the figure, are in fluid communication with the tube 3 but not in communication with the channel 4 in view of the fact that the exterior of the tube 3 is in fluid tight engagement at 7 with a reduced diameter portion of the bore 2.

Disposed upon the shaft 1 for rotation therewith is a reaction plate 8 prevented from axial movement by snap rings 9, and reaction plate 8, however, having a central circular aperture therein numbered 11, the sides of which engage the exterior surface of the shaft 1 so that the plate 8 is rotatable therewith. The reaction plate 8 is annular in configuration, and is provided at its outer periphery with an annular groove 12 within which is disposed a sealing ring 13. The sealing ring 13 is disposed in engagement with the inner surface of a generally annular piston housing 14 which is imperforate so as to contain hydraulic fluid, as will be more fully described hereinafter. It will be seen that the seal 13 in effect divides the interior of piston housing 14 into a pair of spaced fluid chambers 15 and 16.

Mounted to the shaft 1 so as to be axially movable with respect thereto is an annular piston 17. The outer periphery of the piston 17 is provided with a seal 18 disposed in engagement with the inner surface of piston housing 14 to prevent leakage of hydraulic fluid between piston 17 and the piston housing. A snap ring 19 is provided in a suitable groove in the piston housing 14 which engages the left side of piston 17, in the view of the figure, to prevent further movement to the left of the piston 17. A plurality of circumferentially spaced apertures 21 are provided which extend through an inner portion of piston 17 to provide metered cooling flow of fluid to the clutch plates, and suitable sealing means 22 are provided in shaft 1 between the shaft and the annular central opening in piston 17 to prevent fluid flow therebetween. The piston 17 has integrally formed therewith an inwardly extending, annular ledge 23, an inner portion of which carries a snap ring 24. An annular spring 25 having an annular central opening therein seated upon the ledge 23 is provided, the innermost portion of which abuts against the snap ring 24. The spring 25 has a plurality of spaced, radially extending fingers 26 extending to the left, in the view of the figure, away from snap ring 24 and which engage an inwardly facing, upper portion of piston 17.

The radially under side of the ledge 23 is disposed in engagement with the radially outer surface of an annular ledge 27 of an annular piston 28, suitable sealing means 29 being provided between the ledges 23 and 27 to prevent fluid flow therethrough. The piston 28 has a central, circular aperture therein disposed in contact with the outer periphery of the shaft 1, piston 28 being movable axially of the shaft 1 and normally being positioned in engagement with an annular snap ring 30 disposed in the shaft, other sealing means 31 being provided to prevent fluid flow between the shaft and this piston. The ledge 27 has a plurality of spaced openings 32 which extend therethrough to effect fluid communication between the port 6 and the chamber 15 in the piston housing 14. Disposed upon the radially outer surface of the ledge 27 is a generally cup shaped washer 33 having a plurality of openings 34 extending through the horizontally extending section thereof, the outermost surface of the washer 33 abutting against the spring 25, as illustrated in the figure. The outermost portion of piston 28 has integrally formed thereon an inwardly extending flange 35 terminating in a radially extending, annular, inwardly facing surface 36 which is adapted, upon movement of piston 28 toward the right in Figure 1, to engage the associated surface of reaction plate 8 radially outwardly of a plurality of circumferentially spaced openings 37 provided in plate 8. Upon engagement of the surface 36 with plate 8, fluid intercommunication between the chambers 15 and 16 in the piston housing 14—which can normally occur by virtue of the openings 37—is prevented as will be more fully explained hereinafter. The piston 28 is biased toward the position illustrated in Figure 1 by an annular belleville washer 38 having a central circular opening therein in association with the outer surface of the shaft 1, the radially inner portions of the washer 38 being disposed in engagement with one of the snap rings 9 and the outer portion thereof being disposed in engagement with the radially outer portions of the piston 28.

As illustrated in Figure 1, the device is further provided with an annular piston 41 which is similar to piston 17 but oppositely directed. Piston 41 is mounted to the shaft 1, and is provided at its exterior periphery with a seal 42 to prevent fluid flow between the outer edge of the piston 41 and the piston housing 14. A snap ring 43 disposed in the piston housing 14 prevents movement of the piston 41 to the right with respect to the piston housing from the position illustrated in Figure 1. In a radially inner portion of the piston 41 are a plurality of apertures 44 (to provide metered flow of liquid to the associated clutch plates for cooling) and suitable sealing means 45 are provided in the shaft 1 which cooperate with the piston 41 to prevent fluid leakage therebetween. Piston 41 has an integral, inwardly extending, annular ledge 46 near the innermost end of which is provided a snap ring 47. Abutting against the snap ring 47 is an annular spring 48, similar to the spring 25 but oppositely directed, having fingers 49 at its outer periphery engaging the inner surface of the piston 41. The radially inner surface of ledge 46 is disposed in engagement with an annular ledge 51 integrally formed on an annular piston 52, similar to piston 28 but oppositely directed. Suitable sealing means 53 are provided between the ledges 51 and 46 to prevent fluid flow therebetween, and other sealing means 54 are provided in shaft 1 in association with the inner annular opening in the piston 52 to prevent fluid flow between these elements. A snap ring 55 is provided in the shaft 1 which prevents movement of the piston 52 to the right from the position illustrated in Figure 1. The ledge 51 has a plurality of apertures 56 therein permitting fluid flow from the port 5 into the chamber 16 formed in the piston housing 14. Disposed upon the outer surface of ledge 51 is a cup shaped washer 57, similar to the washer 33 but oppositely directed, having a plurality of openings 58 formed in the horizontal portion thereof. As illustrated in the figure the outermost portion of the washer 57 engages the spring 48. The radially outermost portion of piston 52 is provided with an inwardly directed annular flange 59 having an innermost, radially extending, annular surface 61 adapted to engage reaction plate 8 radially outwardly of the openings 37 therein; as previously described with respect to the surface 36 of the piston 28, when surface 61 of piston 52 engages the reaction plate 8, fluid flow between chambers 15 and 16 is thereafter prevented. An annular belleville washer 62, having an annular opening disposed in engagement with the outer surface of the shaft 1, is provided which is similar to the washer 38 but oppositely directed. The belleville washer 62 has its innermost portion disposed against one of the snap rings 9, while the outermost portion thereof engages the piston 52 to bias it toward the position illustrated in Figure 1.

From the foregoing description it will be seen that the piston housing, the pistons 17 and 41, the reaction plate 8, and the pistons 28 and 52 define fluid chambers 15 and 16 within the piston housing 14 which normally are in fluid communication through the openings 37 in the reaction plate 8. In addition, radially inwardly of the chamber 15 another annular fluid chamber 65 is formed by the outer surface of shaft 1, an annular surface 63 integral with the piston 17, the radially inner portion of ledges 23 and 27, and an annular surface 64 on piston 28. Chamber 65 is in fluid communication at all times with the ports 6, and fluid may pass out of this chamber through the apertures 21 in the piston 17 and through the apertures 32 in the ledge 27. Similarly, radially inwardly of chamber 16 another annular chamber 68 is formed by the outer surface of shaft 1, an annular surface 66 on the piston 41, the under surfaces of ledges 46 and 51 and an annular surface 67 on piston 52. Chamber 68 is in fluid communication at all times with the ports 5, and fluid may flow out of the chamber 68 through the apertures 44 in the piston 41 and the apertures 56 in the ledge 51.

Splined to the shaft 1 at opposite sides of the aforedescribed cylinder assembly are clutch hubs 71 and 72 respectively which are generally annular in configuration. Hub 71 is prevented from axial movement along the shaft 1 by snap rings 73 and 74, while hub 72 is prevented from axial movement along the shaft 1 by similar snap rings 75 and 76. The outer periphery of hub 71 has integrally formed thereon splines 77 which engage complementary splines on clutch plates 78 which are interleaved with other clutch plates 79, the latter being splined to an annular cup-shaped clutch drum 81. Also mounted upon the hub 71 are clutch backing means 82 fixed against axial movement to the left, in view of Figure 1, by a snap ring 83. A retainer plate 84 is fixed to the innermost facing portion of hub 71 which has an inwardly directed portion 85 which serves to direct fluid, which flows from the apertures 21 in piston 17, through a plurality of suitable holes 86 in the hub 71, into engagement with the clutch plates 78 and 79.

In similar fashion, in splined engagement with the outermost surface of the hub 72 are a plurality of clutch plates 87 intermeshed with a plurality of clutch plates 88 splined to a cup-shaped clutch drum 89. Also mounted on the hub 72 is a backing plate 91 fixed against movement to the right, in the view of Figure 1, by a snap ring 92. A retainer plate 93 is mounted to the inwardly facing portion of hub 72, plate 93 having an inwardly directed portion 94 which serves to direct fluid, which flows from the apertures 44, into engagement with the clutch plates 87 and 88 through a plurality of suitable holes 95 in the outermost portion of the hub 72.

It will therefore be seen that the intermeshing clutch plates 78 and 79 form a clutch pack indicated in general by the numeral 96, while the intermeshing clutch plates 87 and 88 form a clutch pack indicated in general by the numeral 97.

The clutch drum 81 is fixedly mounted by means of rivets 101 to a gear 102, rotatably mounted on the shaft 1, and intermeshing with other gearing 103. Similarly, the clutch drum 89 is fixedly mounted by means of rivets 104 to a gear 105, rotatably mounted about the shaft 1 and intermeshing with other gearing 106. It will be obvious to those skilled in the art that in the condition illustrated in the Figure 1, neither the gear 102 nor the gear 105 will be driven from the shaft 1. When the clutch pack 96, however, is engaged, rotative power will be transmitted from the hub 71 through the clutch pack 96, and the drum 81 to the gear 102 and ultimately to the gearing 103. Similarly, when the clutch pack 97 is engaged rotative power will be transmitted through the hub 72, clutch pack 97, the drum 89 to the gear 105 and ultimately to the gearing 106.

Considering now in greater detail the operation of the device of the present invention, the shaft 1 is normally rotatable from the engine, the hubs 71 and 72, the pistons 17 and 41, the pistons 28 and 52, the springs 25 and 48, washers 33 and 57, the belleville washers 38 and 62, reaction plate 8 and piston housing 14 being rotatable with the shaft 1. Hydraulic fluid under pressure is constantly supplied to the assembly through both the passageway 4 and the tube 3 so that the chambers 15, 16, 65 and 68 are maintained full of hydraulic fluid, normally at equal pressure. The oil in these chambers will, of course, also be rotated. In view of the fact that the pressure in each of the chambers is equalized (the chambers being in fluid communication through the openings 37 and the apertures 32 and 56), and the fact that the areas of the pistons 17 and 41 are identical, as are the areas of the pistons 28 and 52, against which this oil under pressure operates, the net centrifugal effect on the assembly due to this fluid is zero. The snap rings 24 and 47 respectively determine the pre-load in the springs 25 and 48 to apply predetermined bias to the pistons 17 and 41 to maintain these pistons in the position illustrated in Figure 1.

As previously indicated, under the condition illustrated in Figure 1 there is no drive from the shaft 1 to either the gearing 103 or the gearing 106 inasmuch as neither of the clutch packs 96 or 97 are engaged. Assuming it is desired to effect the drive from the shaft 1 through the gear 105 to the gearing 106, fluid at an increased pressure is transmitted to the device through the annular passageway 4, ports 5 and into the chamber 68. The belleville washer 62 is chosen to be substantially stronger in biasing effect than is the spring 25; as a result, when fluid at an increased pressure is supplied to the chamber 68, initially piston 41 is moved toward the right into engagement with the clutch plates forming the clutch pack 97 carrying the piston housing 14 toward the right because piston 41 engages snap ring 43. Piston 17 will be moved simultaneously toward the right by housing 14 (in view of the engagement between piston 17 and snap ring 19), piston 17 moving against the bias of the relatively weak spring 25. During this initial period of movement toward the right of the piston 17, fluid in the chamber 15 flows past the surface 36 on piston 28, through openings 37 in the reaction plate 8 and into the chamber 16 past the surface 61 on piston 52 to keep chamber 16 full of fluid. It should be noticed that as the piston 17 is moved toward the right, the washer 33 has maintained the radially innermost portion of the spring 25 against movement to the right, so as to progressively increase the outwardly biasing effect on the piston 17. Simultaneously, the volume of chamber 65 is decreased, fluid passing outwardly therefrom into ports 6; as this occurs, fluid from the external source is supplied to keep chamber 68 filled with fluid as the volume of chamber 68 increases due to the movement of piston 41.

When the piston 41 has engaged the clutch plates comprising the clutch pack 97 so that further movement toward the right is resisted, pressure will increase in the chamber 68 sufficiently to effect movement of the piston 52 to the left, into tight engagement with reaction plate 8, against the bias of the belleville washer 62. Upon engagement of the piston 52 with the reaction plate 8, the surface 61 effects a seal therewith, preventing further transfer of fluid between chambers 15 and 16. The opposition to further movement to the right of the piston 41 offered by the clutch pack 97, and the fact of engagement of the piston 52 with the fixed reaction plate 8, permits a further increase in the pressure in chamber 68 which is transmitted through the openings 56 in ledge 51 and the openings 58 in washer 57 into the chamber 16 to "seal" the plates 87 and 88 together and cause a complete coupling between hub 72 and the drum 89.

As a result, the gear 105 which is connected to drum 89, and the gearing 106 in mesh therewith, are driven from the shaft 1.

When it is desired to return the device to the neutral position illustrated in Figure 1, the high pressure fluid source is disconnected from the passageway 4. As fluid passes out of the chamber 68 through the openings 44, port 5 and passageway 4, and the pressure in chamber 68 decreases, belleville washer 62 will effect movement of the piston 52 away from the reaction plate 8. Fluid may therefore once again pass between the chambers 15 and 16 through the openings 37 in the plate 8. Simultaneously, the spring 25 will act to bias the piston 17 toward the left, toward the position illustrated in Figure 1, piston 17 carrying piston housing 14 toward the position of Figure 1 by virtue of the engagement of the piston 17 with the snap ring 19. As this movement of the piston 17 toward the left occurs, it will be obvious that the volume of chamber 16 decreases, while the volume of chamber 15 increases, fluid being transferred between these chambers to maintain them in full condition through the openings 37 in the reaction plate 8, as previously described.

It will be obvious to those skilled in the art that engagement and disengagement of the clutch pack 96 is effected in a manner comparable to that described with regard to the clutch pack 97, so a detailed explanation will not be made here.

From the foregoing explanation it will be seen that the device of the present invention is very simple and relatively economical, and yet one which operates with certainty. In addition, the possibility of simultaneous actuation of both of the clutch packs is obviated by virtue of the fact that each of the pistons carries the piston housing with it upon operation, the piston housing being connected to the opposite piston, so that both pistons may not move to engage their respective clutch packs simultaneously. In addition, it is very important to notice that the effects of centrifugal force on the oil with which the piston housing is maintained filled are nullified. The fact that the piston housing remains at all times filled with oil permits extremely rapid engagement of either of the clutch packs inasmuch as no time is lost in refilling the oil containing chambers, and the device of the present invention in actual tests has operated in one-tenth of the time required to operate similar devices previously known. This is due to the fact that the amount of fluid required from the external source to effect engagement of either of the clutch packs is equal only to the incremental amount necessary to keep either chamber 65 or 68 filled with fluid as the associated piston moves to effect clutch engagement, chambers 15 and 16 being maintained filled by the transfer of fluid through openings 37, as previously described.

In Figure 2 there is shown schematically an operative system employing the device of the present invention. In that figure shaft 1 is illustrated carrying the clutch packs 96 and 97, the piston housing 14, the pistons 17 and 41, and the other elements previously described. It will be seen that the gear 102 is shown in meshing relation with gearing 103, the latter being mounted upon a suitable countershaft 111 so that upon engagement of the clutch pack 96, power is transmitted from the engine, the shaft 1, and through the shaft 1 the clutch pack 96, gear 102, gearing 103 and countershaft 111, shaft 111 being attached by suitable means to the drive wheels of the vehicle (not shown). Similarly, upon engagement of the clutch pack 97 in the manner previously described, power will flow from the engine to the shaft 1, clutch pack 97, gear 105, gearing 106 to the countershaft 111 upon which the gearing 106 is mounted, and from the shaft 111 to the driving wheels of the vehicle. It should be noted that the gear 102—gearing 103 combination is different in reduction than the gear 105—gearing 106 combination, so that the shaft 111 will be driven at one speed when the clutch pack 96 is engaged and at a different speed when the clutch pack 97 is engaged.

To supply hydraulic fluid to the piston housing 14 in the manner previously described, Figure 2 illustrates that shaft 1 is provided with radially extending ports 112 in fluid communication with the passageway 4 (formed in the shaft 1 between the periphery of the bore 2 of the shaft 1 and the tube 3 disposed therein). The ports 112 are in fluid communication with hydraulic fluid carrying means 113. Similarly, hydraulic fluid carrying means 114 are provided in fluid communication with the tube 3 previously described. The fluid carrying means 113 and 114 are respectively connected to a selector valve, indicated in general by the numeral 115, which is supplied by a high pressure fluid carrying line 116 and a low pressure fluid carrying line 117. The selector valve 115 may be of conventional type which, when in one position, will permit fluid flow from the low pressure line 117 to both of the fluid carrying means 113 and 114 simultaneously; when the selector valve 115 is placed in a different position, the low pressure line will be connected to one of the fluid carrying means 113 or 114, and the high pressure line 116 will be connected to the other of these fluid carrying means. The fluid carrying lines 116 and 117 are supplied with fluid from a suitable pump 118 in fluid communication with a sump 119. The pump 118 delivers high pressure fluid to a line 121 which is in turn connected to the junction between the high pressure line 116 and a line 122, the latter being in fluid communication with a regulator valve 123 of conventional type adapted to maintain the pressure in line 116 at a desired level. The regulator valve 123 is in turn connected to a hydraulic line 124 which carries fluid to a torque converter 125 of the vehicle in which the device of the present invention is disposed, the converter having an output hydraulic line 126. Line 126 is attached to a cooler 127, through which the hydraulic fluid flows to a line 128 which is in fluid communication with the low pressure line 117 and a line 129, the latter being in fluid communication with a regulator valve 131 adapted to maintain the pressure in the low pressure line 117 at a predetermined level. Regulator valve 131 is also connected to a fluid carrying line 132 connected to the sump 119, as will be readily apparent to those skilled in the art.

It will be seen by the foregoing explanation of the system that the pump 118 and the regulator valve 123 operate in conjunction to supply line 116 with a constant supply of high pressure fluid; in addition the elements in the system maintain a constant, relatively low pressure in the line 117. As a result, selector valve 115 when in normal position continuously supplies low pressure fluid from the line 117 to both fluid carrying means 113 and 114, and consequently to the fluid chambers 15 and 16 in the piston housing 14. Upon movement of the selector valve to a position in which the high pressure line 116 is connected to the fluid carrying means 113, high pressure fluid will immediately be supplied to the chamber 16 in the housing 14 to effect immediate engagement of the clutch pack 97; conversely, when the selector valve is moved to a position where the high pressure line is connected to the fluid means 114, high pressure fluid is immediately supplied to the chamber 15 in the housing 14 to effect immediate engagement of the clutch pack 96.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

We claim:

1. A hydraulically operable clutch system including a shaft adapted for rotation, a pair of spaced clutch packs mounted upon said shaft and constructed and arranged to transmit rotative drive from said shaft to gearing associated with said clutch packs, a piston housing disposed between said clutch packs and surrounding a portion of said shaft, means in said housing including a first piston carried by said shaft and axially movable relative thereto to effect operation of one of said clutch packs and defining a first variable volume chamber therein, means in said housing including a second piston carried by said shaft and axially movable relative thereto to effect operation of the other of said clutch packs and defining a second variable volume chamber therein, means in said housing including said first piston defining a third variable volume chamber adjacent said shaft smaller in volume than said first chamber, means in said housing including said second piston defining a fourth variable volume chamber adjacent said shaft smaller in volume than said second chamber, means normally permitting fluid flow between said first and second chambers, means operable to prevent further fluid flow between said first and second chambers, and means adapted to maintain each of said chambers full of fluid including means in fluid communication respectively with said third and fourth chambers and adapted to selectively increase the fluid pressure therein to effect piston movement.

2. The system defined in claim 1 in which said means defining said third and fourth chambers respectively are constructed and arranged to operate said means operable to prevent fluid flow between said first and second chambers.

3. The system defined in claim 1 in which an axially fixed plate is carried by said shaft within said housing intermediate said first and second pistons, and in which said means normally permitting fluid flow between said first and second chambers comprise aperture defining means in said plate.

4. The system defined in claim 1 in which said means defining said third and fourth chambers respectively are constructed and arranged to operate said means operable to prevent fluid flow between said first and second chambers, and in which an axially fixed reaction plate carried by said shaft is disposed within said housing intermediate said first and second pistons, and in which said means normally permitting fluid flow between said first and second chambers comprise aperture defining means in said reaction plate.

5. The system defined in claim 1 in which said means in fluid communication respectively with said third and fourth chambers comprise a plurality of fluid passageways extending longitudinally in said shaft.

6. The system defined in claim 1 in which said means in fluid communication respectively with said third and fourth chambers comprise a plurality of fluid passageways extending longitudinally in said shaft, and in which said means defining said third and fourth chambers respectively are constructed and arranged to operate said means operable to prevent fluid flow between said first and second chambers.

7. A hydraulically operable clutch system including a shaft adapted for rotation, a pair of spaced clutch packs mounted upon said shaft and constructed and arranged to transmit rotative drive from said shaft to gearing associated with said clutch packs, a piston housing disposed between said clutch packs and surrounding a portion of said shaft, a pair of pistons in said housing respectively adjacent said spaced clutch packs and mounted to said shaft for axial movement relative thereto, a reaction plate carried by said shaft disposed between said pistons and dividing said housing into a pair of fluid chambers, means preventing axial movement of said reaction plate relative to said shaft, means in said shaft adapted to carry pressurized fluid to each of said fluid chambers, means connected to said shaft means to maintain said fluid chambers full of fluid at all times and to selectively supply fluid at different pressures to said fluid chambers, means in said reaction plate normally permitting fluid flow between said chambers, and means in each of said chambers operable in response to fluid pressure to block fluid flow between said chambers.

8. In a hydraulically operable clutch, a shaft adapted for rotation, a pair of spaced clutch packs mounted upon said shaft and constructed and arranged to transmit rotative drive from said shaft to gearing associated with said clutch packs upon engagement of said clutch packs, and means to effect engagement of said clutch packs comprising a piston housing disposed between said clutch packs and surrounding a portion of said shaft, a pair of pistons in said housing respectively adjacent said spaced clutch packs and mounted to said shaft for axial movement relative thereto, reaction means carried by said shaft fixed against axial movement relative thereto disposed within said housing intermediate said pistons and dividing said housing into a pair of chambers, means in said reaction means normally permitting fluid flow between said chambers, means in said shaft adapted to carry pressurized fluid to said housing at opposite sides of said reaction means, and means responsive to fluid pressure to block fluid flow between said chambers.

9. The device defined in claim 8 in which means are provided to effect axial movement of said pistons as either of said pistons moves toward its associated clutch pack.

10. The device defined in claim 8 in which means are provided to effect axial movement of said piston housing with either of said pistons as either of said pistons moves toward its associated clutch pack, said last mentioned means being constructed and arranged to effect movement of both pistons and said housing in one axial direction upon movement of one of said pistons toward its associated clutch pack.

11. In a hydraulically operable clutch, a shaft adapted for rotation, a pair of spaced clutch packs mounted upon said shaft and constructed and arranged to transmit rotative drive from said shaft to gearing associated with said clutch packs upon engagement of said clutch packs, and means to effect engagement of said clutch packs comprising a piston housing disposed between said clutch packs and surrounding a portion of said shaft, a pair of pistons in said housing respectively adjacent said spaced clutch packs and mounted to said shaft for axial movement relative thereto, reaction means carried by said shaft and fixed against axial movement relative thereto disposed within said housing intermediate said pistons and dividing said housing into a pair of chambers, means in said reaction means normally permitting fluid flow between said chambers, means in said shaft adapted to carry pressurized fluid to said housing at opposite sides of said reaction means, a second pair of pistons disposed respectively in said pair of chambers and mounted upon said shaft for axial movement relative thereto, and means on said second pair of pistons adapted to present fluid flow between said chambers.

12. In a hydraulically operable clutch, a shaft adapted for rotation, a pair of spaced clutch packs mounted upon said shaft and constructed and arranged to transmit rotative drive from said shaft to gearing associated with said clutch packs upon engagement of said clutch packs, and means to effect engagement of said clutch packs comprising a piston housing disposed between said clutch packs and surrounding a portion of said shaft, a pair of pistons in said housing respectively adjacent said spaced clutch packs and mounted to said shaft for axial movement relative thereto, reaction means carried by said shaft and fixed against axial movement relative thereto disposed within said housing intermediate said pistons and dividing said housing into a pair of chambers, means in said reaction means normally permitting fluid flow between said chambers, means in said shaft adapted to carry pressurized fluid to said housing at opposite sides of said reaction means, a second pair of pistons disposed respectively in said pair of chambers and mounted upon said shaft for axial movement relative thereto, means respectively on said second pair of pistons respectively disposed in engagement with each of said first mentioned pair of pistons to define subchambers within said chambers in fluid communication with said means adapted to carry fluid to said housing, and means on each of said second pair of pistons adapted upon predetermined fluid pressure conditions in said subchambers to prevent fluid flow between said chambers.

13. The device defined in claim 12 in which said means respectively on said second pair of pistons are provided with means defining a plurality of relatively small apertures extending therethrough to effect fluid communication between each of said subchambers and the remainder of the chamber in which it is disposed.

14. In a hydraulically operable clutch, a shaft adapted for rotation, a pair of spaced clutch packs mounted upon said shaft and constructed and arranged to transmit rotative drive from said shaft to gearing associated with said clutch packs upon engagement of said clutch packs, and means to effect engagement of said clutch packs comprising an annular piston housing disposed between said clutch packs and surrounding a portion of said shaft, a pair of annular pistons in said housing each of which is adjacent one of said spaced clutch packs and mounted to said shaft for relative movement axially thereof, an annular reaction plate mounted upon said shaft between said pistons, means preventing axial movement of said reaction plate relative to said shaft, means preventing fluid flow between the outer periphery of said reaction plate and said housing whereby said reaction plate divides said housing into a pair of fluid chambers, means in said shaft adapted to carry pressurized fluid to each of said fluid chambers, opening defining means in said reaction plate normally permitting fluid flow between said chambers, means to effect axial movement of said piston housing and one of said pistons upon axial movement of the other of said pistons toward its associated clutch pack, means biasing said pistons against movement by said housing, fluid pressure responsive means operable to block fluid flow between said chambers, and means biasing said fluid pressure responsive means toward inoperative position.

15. A hydraulically operable clutch system including a shaft adapted for rotation, a pair of spaced clutch packs mounted upon said shaft and constructed and arranged to transmit rotative drive from said shaft to gearing associated with said clutch packs, a piston housing disposed between said clutch packs and surrounding a portion of said shaft, a pair of pistons in said housing respectively adjacent said spaced clutch packs and mounted to said shaft for axial movement relative thereto, a reaction plate carried by said shaft and disposed between said pistons and dividing said housing into a pair of fluid chambers, means preventing axial movement of said reaction plate relative to said shaft, means in said shaft adapted to carry pressurized fluid to each of said fluid chambers, means connected to said shaft means to maintain said fluid chambers full of fluid at all times and to selectively supply fluid at different pressures to said fluid chambers, means in said reaction plate normally permitting fluid flow between said chambers, and means in each of said chambers operable in response to fluid pressure to block fluid flow between said chambers, comprising a second pair of pistons mounted upon said shaft and respectively disposed in said chambers and including portions engaging said first-mentioned pistons to define a subchamber in fluid communication with said means in said shaft, said second pair of pistons including means defining relatively restricted opening defining means extending therethrough effecting communication between the subchamber and the associated fluid chamber.

16. In a hydraulically operable clutch, a shaft adapted for rotation, a pair of spaced clutch packs mounted upon said shaft constructed and arranged to transmit rotative drive from said shaft to gearing associated with said clutch packs upon engagement of said clutch packs, and means to effect engagement of said clutch packs comprising an annular piston housing disposed between said clutch packs and surrounding a portion of said shaft, a pair of annular pistons in said housing each of which is adjacent one of said spaced clutch packs and mounted to said shaft for relative movement axially thereof, an annular reaction plate mounted upon said shaft between said pistons, means preventing axial movement of said reaction plate relative to said shaft, means preventing fluid flow between the outer periphery of said reaction plate and said housing whereby said reaction plate divides said housing into a pair of fluid chambers, means in said shaft adapted to carry pressurized fluid to each of said fluid chambers, opening defining means in said reaction plate normally permitting fluid flow between said chambers, means to effect axial movement of said piston housing and one of said pistons upon axial movement of the other of said pistons toward its associated clutch pack, means biasing said pistons against movement by said housing, fluid pressure responsive means operable to block fluid flow between said chambers, and means biasing said fluid pressure responsive means toward inoperative position, each of said pistons including an annular flange projecting toward said reaction plate, said fluid pressure responsive means comprising a second pair of annular pistons mounted to said shaft and respectively disposed in said fluid chambers between said reaction plate and said first-mentioned piston, each of said second pair of pistons including an annular flange projecting away from said reaction plate and in engagement with said annular flange on the adjacent first-mentioned piston and defining therewith a fluid subchamber in fluid communication with certain of said means adapted to carry fluid to said housing, said annular flanges on said second pistons including means defining relatively restricted openings extended therethrough whereby increases of pressure in either of said subchambers are not immediately experienced in the remainder of the associated chambers.

17. In a hydraulically operable clutch for association with a shaft adapted for rotation, a piston housing surrounding a portion of said shaft, a pair of pistons in said housing and adapted for mounting on said shaft for axial movement relative thereto, axially fixed means between said pistons defining with said housing and said pistons a pair of fluid chambers, means in said axially fixed means normally permitting fluid flow between said chambers, a second pair of pistons adapted for mounting upon said shaft for axial movement relative thereto disposed in said chambers and including portions engaging said first-mentioned pistons to define subchamber means smaller in volume than the remainder of the respective chambers, said second pair of pistons including means defining relatively restricted opening defining means extending therethrough effecting fluid communication between the subchambers and the remainder of the associated fluid chambers, said second pair of pistons further including means effective to block fluid flow between said chambers through said means in said axially fixed means.

18. A hydraulic clutch system comprising a shaft, an annular housing axially movable with respect to said shaft and coaxially disposed with respect thereto, a reaction plate fixed axially with respect to said shaft, a pair of clutch packs spaced axially from said reaction plate, one on each side thereof, first piston means slidably mounted on said shaft between said reaction plate and each of said clutch packs and adapted to be moved alternatively away from said reaction plate to effect engagement of one or the other of said clutch packs, second piston means cooperating with said housing, said first piston means and said reaction plate to define a pair of annular chambers one on each side of said reaction plate and radially spaced from said shaft, said second piston means further defining in cooperation with said first piston means and said shaft a pair of annular chambers between said first annular chambers and said shaft, means for introducing fluid into said chambers at relatively low pressure, a plurality of openings in said reaction plate providing free fluid communication between one and the other of said first chambers, means for increasing the pressure of fluid in one or the other of said inner chambers to effect movement of one of said first piston means into engagement with one of said clutch packs and to effect movement of one of said second piston means towards said reaction plate to terminate the free fluid communication between one and the other of said first chambers.

References Cited in the file of this patent

UNITED STATES PATENTS

| | | |
|---|---|---|
| 555,036 | Church | Feb. 18, 1896 |
| 857,393 | Hagman | June 18, 1907 |
| 2,386,220 | Lawler | Oct. 9, 1945 |
| 2,464,538 | Vanderzee | Mar. 15, 1949 |
| 2,632,544 | Hockert | Mar. 24, 1953 |

FOREIGN PATENTS

| | | |
|---|---|---|
| 522,088 | Belgium | Aug. 31, 1953 |